Figure 1:
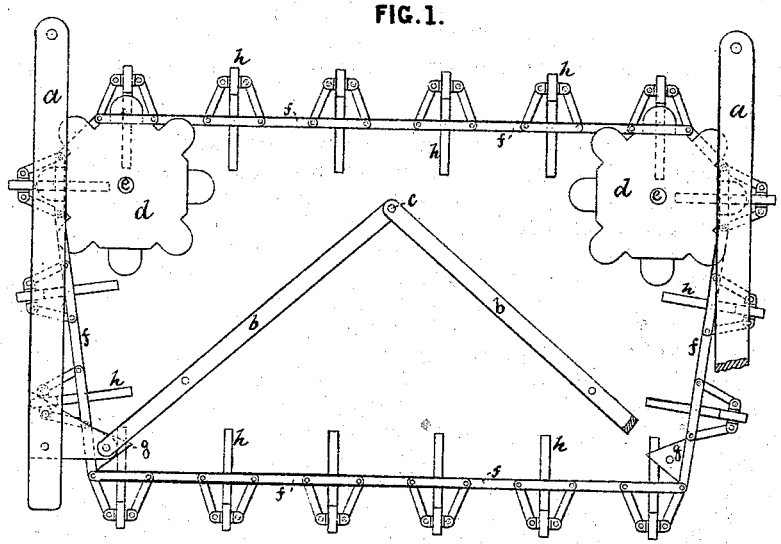
Figure 2:
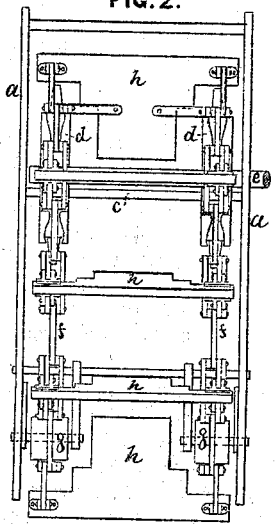
Figure 3:
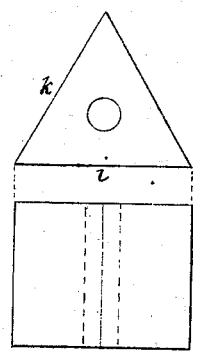

J. W. WHINYATES.
Endless-Chain Propellers.

No. 137,269. Patented March 25, 1873.

Witnesses.
Chas. H. Smith.
Geo. D. Walker.

Inventor.
John W. Whinyates
Lemuel W. Serrell.
atty.

AM. PHOTO-LITHOGRAPHIC CO. N.Y. (OSBORNE'S PROCESS.)

UNITED STATES PATENT OFFICE.

JOHN W. WHINYATES, OF LIVERPOOL, ENGLAND.

IMPROVEMENT IN ENDLESS-CHAIN PROPELLERS.

Specification forming part of Letters Patent No. 137,269, dated March 25, 1873.

*To all whom it may concern:*

Be it known that I, JOHN WASHINGTON WHINYATES, of Liverpool, in the county of Lancaster, England, have invented certain Improvements in Propelling and Steering Ships and other Vessels and in Machinery or apparatus therefor, of which the following is a specification:

Endless chains carrying buckets and passing around wheels have been employed for propelling vessels, and propellers of various kinds have been employed to give lateral motion and steer the vessel.

My present invention consists in a propeller in which the endless chains of buckets are mounted upon drums in adjustable frames so as to be raised or lowered, and such frames also carry angular wheels, beneath which the chains pass; and these angular wheels are proportioned to the length of links in the chain, so that the propeller floats or buckets are suddenly turned from a horizontal to a vertical position, and vice versa, so as to be either in position for action upon the water or turned edgewise to the water in moving through the same. This device is adapted to use as a propeller or in steering.

The action of the apparatus is as follows: Motion being communicated to the wheels $d\ d$, or to one of them, the chains $f\ f$ and propellers $h\ h$ are set in motion. The wheels $d\ d$ are then nearly or entirely out of water, (according as the ship is loaded.) The chains $f\ f$, with the propellers $h\ h$ attached, are driven down into the water till they reach the angular wheels or receiving-journals $g\ g$ at bottom, which, having the sides corresponding to the size of the links of the chain, are caused or enabled by their construction or shape, as before described, to turn the propellers at right angles from a vertical to a horizontal position, and so to continue until reaching the angular wheel or wheels on the other end of the frame, thus causing the propellers to make a direct straight stroke in the water, and to obtain a direct action on the water from one angular wheel to the other. As soon as the chains with the propellers arrive at the other angular wheel or wheels at the other end of the frame the propellers are again suddenly brought to a vertical position from the horizontal position which they had just occupied, and continue to rise in a vertical position as they had descended on the other side of the frame until they reach the driving-wheel above, and so on, continuously.

According to other arrangements, I place endless chains, fitted with propellers and angular wheels in the manner before described, in the center, or in the bow or stern, or both bow and stern, of a ship or vessel, in which case an aperture or apertures is formed in the ship for the endless chains with propellers to pass through. This arrangement may be used alone or in combination with the arrangements first described at each side of the ship or vessel. By working one set of the propellers on one side of the ship and not the other the vessel may be steered, or by working one set forward and the other backward the vessel is turned.

Figure 4:
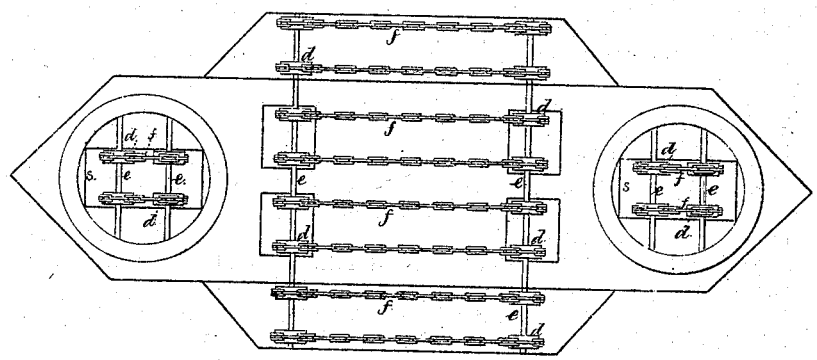

Fig. 4 is a view in plan of a vessel fitted with propellers according to my invention, where the said propellers are placed in the center of the ship or vessel or within the hull, as well as at the sides, or they may be applied within the hull only. With propellers applied in this manner I am able to construct vessels of exceedingly light draft of water, and consequently particularly suitable for use in canals and other places where waters are shallow. An additional advantage obtained by placing the propellers within the hull is that the side wash of the water generally so objectionable in paddle and screw boats is almost entirely prevented. In this figure I also show, at the bow and stern of the same vessel, the position or positions of my apparatus or machinery arranged in a more compact manner, and more suitable for steering purposes than the arrangements just described.

Figure 5:
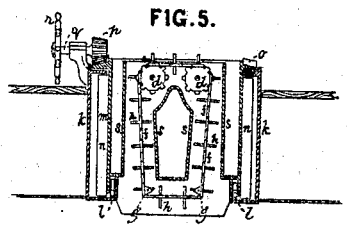
Figure 6:
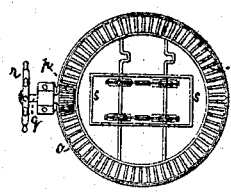

Fig. 5 shows in section and Fig. 6 in plan sufficient of this arrangement to illustrate its construction and action. $k$ is a fixed cylinder inserted in or built up with the ship or vessel, having a flange or bearing at its lower end. $l\ l$ are rollers or supports resting on the flange. $m$ is a loose or movable cylinder inserted in the fixed cylinder $k$, and free to turn therein. $n$ is a roller or guide, or rollers or guides, between the fixed cylinder $k$ and the movable cylinder $m$. $o\ o$ are teeth or cogs fitted to the upper end of the movable cylinder $m$. $p$ is a bevel-wheel gearing into the teeth $o\ o$ on a shaft, $q$, which has motion communicated to it by the steering-wheel $r$; thus, by turning the wheel $r$, rotary motion is also given to the movable cylinder $m$. $d\ d$ are toothed or notched wheels. $f\ f$ are endless chains, and $h\ h$ the propellers, all corresponding with those before described and driven in a similar manner. $s$ is a partition to prevent water rising into the vessel. Thus it will be understood that the propellers being placed in the movable cylinder consequently move therewith. Therefore, as the propellers revolve and drive the ship forward or backward, as the case may be, the blades may at the same time be turned to any desired angle and the vessel thereby steered.

Although I have shown and described at Fig. 4 a vessel fitted with machinery or apparatus, as just described, at both the bow and stern of such vessel, still I wish it to be understood that such apparatus may be fitted at both ends or at one end only, or, in fact, at any other part of the ship or vessel found convenient, without in any way departing from this my invention.

I do not limit myself to the precise arrangement or arrangements hereinbefore described, provided always the essential features of the invention are maintained.

I claim as my invention—

1. A chain-propeller mounted in an adjustable frame carrying the chain-wheels $d$, and the angular wheels $g$, around which the chain, with the propellers or buckets, passes, substantially as set forth.

2. The cylinders $k$ and $m$, in combination with the chain-propeller $f\ h$, and mechanism for revolving the cylinder $m$, substantially as and for the purposes set forth.

JOHN WASHINGTON WHINYATES.

Witnesses:
 WILL. BARTLETT,
  *Notary Public, Liverpool.*
 EDWD. WILLIAMS.